United States Patent [19]

Ellsberg

[11] 4,233,642
[45] Nov. 11, 1980

[54] SAFETY INTERLOCK SYSTEM

[76] Inventor: Thomas R. Ellsberg, 6339 Coldwater Canyon, North Hollywood, Calif. 91606

[21] Appl. No.: 7,359

[22] Filed: Jan. 29, 1979

Related U.S. Application Data

[63] Continuation-in-part of Ser. No. 866,287, Jan. 3, 1978, abandoned, which is a continuation-in-part of Ser. No. 709,314, Jul. 28, 1976, abandoned.

[51] Int. Cl.³ .......................................... H01H 47/32
[52] U.S. Cl. .................................... 361/172; 70/278; 307/10 AT
[58] Field of Search ................ 361/171, 172; 340/164, 340/147 M, 147 CN; 70/278; 307/10 AT; 180/114

[56] References Cited

U.S. PATENT DOCUMENTS

| | | | |
|---|---|---|---|
| 3,691,396 | 9/1972 | Hinrichs | 361/172 X |
| 3,718,202 | 2/1973 | Brock | 361/172 X |
| 3,754,148 | 8/1973 | Nye | 361/172 X |
| 3,784,839 | 1/1974 | Weber | 361/172 X |
| 3,805,246 | 4/1974 | Colucci et al. | 340/164 R X |
| 3,829,834 | 8/1974 | Frankland et al. | 340/164 R X |

Primary Examiner—Harry E. Moose, Jr.
Attorney, Agent, or Firm—Robert J. Schaap

[57] ABSTRACT

A safety interlock system for automotive vehicles and like devices which have an electrically operable component forming part of the engine of said vehicle or like device. The safety interlock system comprises a plurality of latches in the form of integrated circuits which can only be operated in preestablished sequence with a preestablished code of indicia. When the latches are opened pursuant to the preestablished code with inputs in proper sequence from a plurality of manually operable input switches, the interlock system will be enabled, thereby permitting operation of the electrically operable component and hence said engine. Suitable forms of system time delays and system override devices are provided to enable operation of said engine by others for preestablished time delay periods and under controlled delay conditions. The interlock system of the present invention also includes a unique control system for operating locks such as hood locks and controlling the same, along with the control to the engine. In addition, a unique alarm circuit is also incorporated in the safety interlock system, such that an alarm can be generated when unauthorized opening of any portion of the vehicle occurs.

41 Claims, 13 Drawing Figures

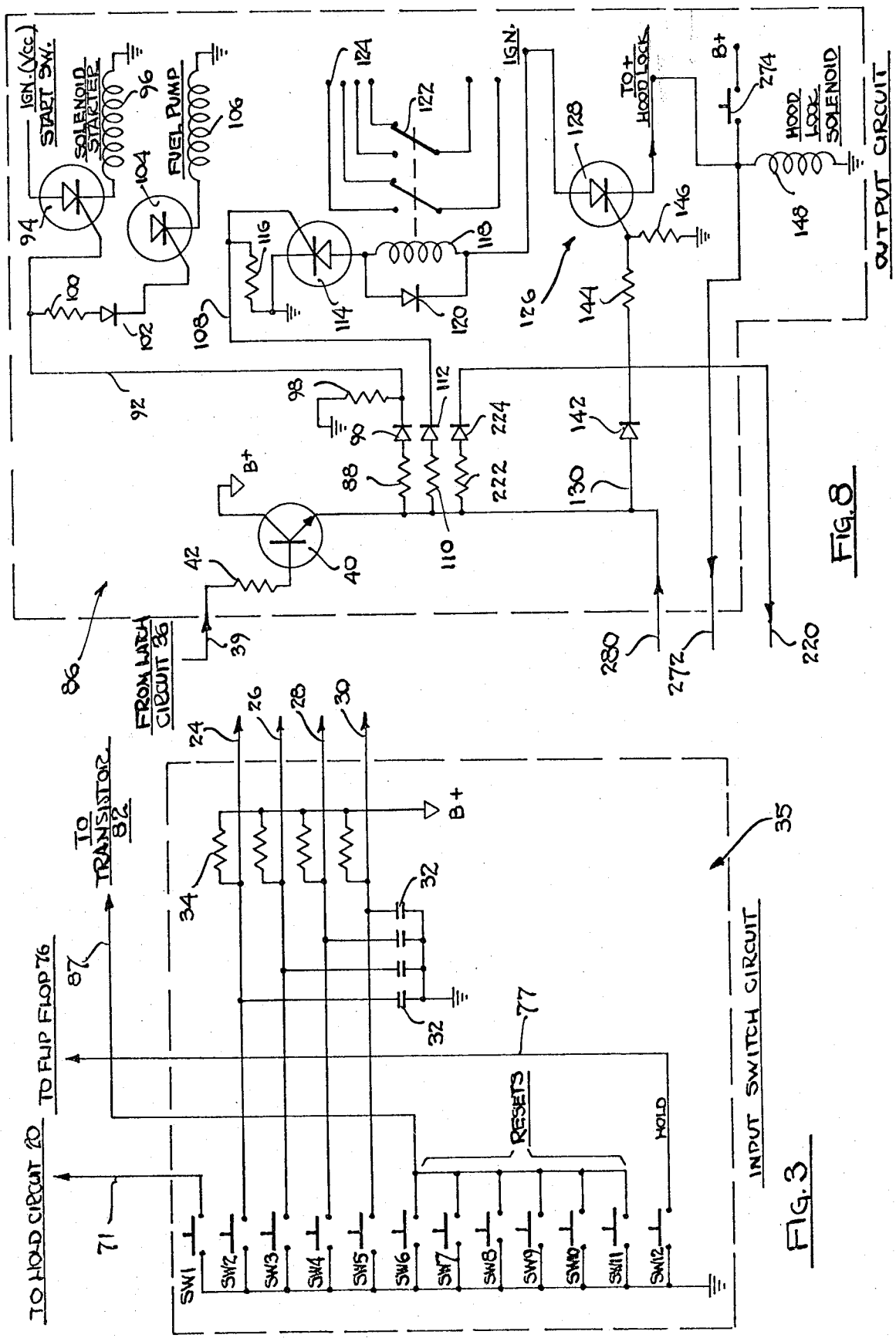

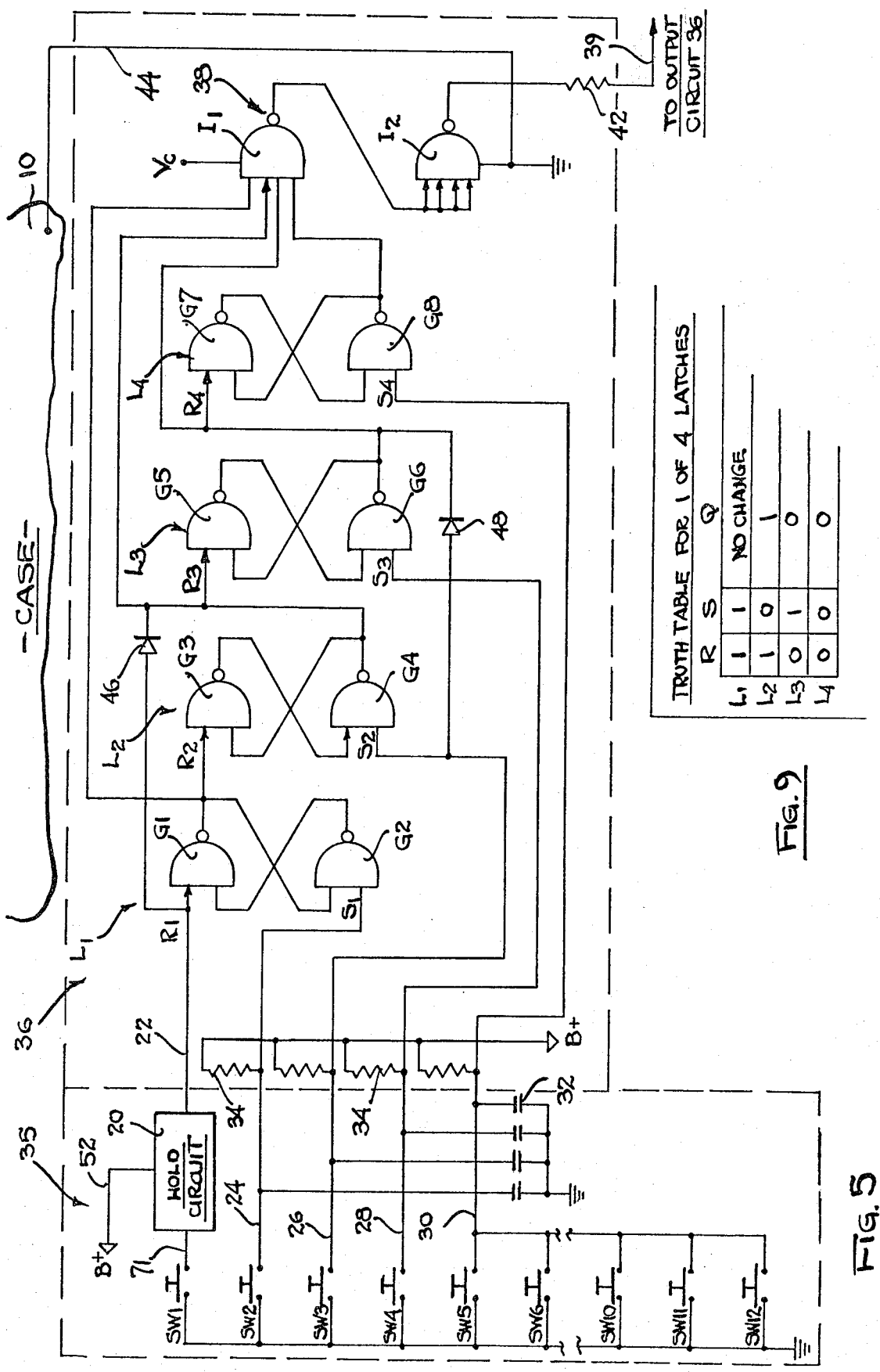

SAFETY INTERLOCK SYSTEM

RELATED APPLICATION

This Application is a continuation-in-part patent application of U.S. application Ser. No. 866,287 filed Jan. 3, 1978, entitled "Safety Interlock System", now abandoned which is, in turn, a continuation-in-part patent application of U.S. application Ser. No. 709,314, filed July 28, 1976, entitled "Safety Interlock System", now abandoned.

BACKGROUND OF THE INVENTION

This invention relates in general to certain new and useful improvements in safety interlock systems and, more particularly, to safety interlock systems which are especially designed to prevent theft or other unauthorized removal of automotive vehicles and like apparatus.

In recent years, theft of automotive vehicles has become quite prevalent and, in fact, has given rise to large-scale businesses based on stealing and resale of such automotive vehicles. In order to obviate this problem, various manufacturers of automotive vehicles and, in addition, various suppliers of safety systems and theft-prevention systems and the like have proposed alarm systems for use in these vehicles which advise of the potential theft or otherwise unauthorized removal of the vehicle. These alarm systems generally rely upon electronic sound alarms which are generated upon unauthorized attempts of removal. However, one skilled in these particular alarm systems is capable of short-circuiting the alarm system or otherwise removing the vehicle in such manner as to obviate the generation of the alarm signal.

There has been at least one proposal which utilizes an encoded switching system which must be actuated prior to operation of the vehicle. This encoded switch system essentially operates in the same manner as a combination switch which is designed to prevent operation of the vehicle until such time as the proper combination has been introduced into the switch to energize the same and in order to thereby operate the vehicle. While this interlock system certainly provides many advantages over the alarm system, these interlock systems are quite deficient in many respects. One of these deficiencies resides in the fact that these interlock systems can be easily obviated by one skilled in the art of unauthorizedly removing vehicles and the like. Furthermore, the conventionally available interlock systems are easily rendered ineffective by quickly determining the code through electrical signal measurements in the operation thereof.

In accordance with the safety switching systems of the type presently proposed, these systems rely upon a plurality of push buttons, or other switching inputs, which are actuated in order to produce a certain number of signals in proper sequence in order to open the interlock to thereby permit the starting of the vehicle. However, these systems utilize discrete components and, in addition, are designed so that one skilled in basic electronics can easily determine the encoding of the switching interlock. These systems utilize R-S flip-flops which operate silicon controlled rectifier circuits and which permit operation of the starter solenoid of a vehicle. In addition, these systems may also be connected to other components of the vehicle such as the fuel pump. However, these systems which use the discrete components are so designed in order to permit the energization of the vehicle, are also capable of having their coding easily detected, since the components of the circuit generally provide a 10-15-milliamp current. One skilled in the art of a basic electronic meter can easily detect the code by merely pressing the push button switches in order to determine the proper coding to operate the vehicle. Moreover, a relatively inexpensive gauge can be used in a very short time by one basically informed in the use of this system so that the system has been quickly obviated.

Another one of the problems of the safety interlock systems of the prior art is that they do not provide for the automatic release and locking of a suitable lock mechanism located within the engine compartment. It has been established that the typical auto thief will attempt to open the hood of a vehicle and thereby disconnect a safety interlock system where possible. This is particularly true in the case of the vehicles which do not provide a hood release in the passenger compartment of the vehicle.

There have been many proposed locking mechanisms for locking the hood of the vehicle, although they did not include a safety interlock system. Thus, any knowledgeable thief is capable of starting the ignition of the vehicle without the necessity of operating on any portion of the engine included within the engine compartment of the vehicle.

Alarm systems have also been proposed for use to prevent theft of automotive type vehicles. Here, again, these alarm systems could be easily disconnected, particularly in those vehicles where a hood lock was not provided.

OBJECTS OF THE INVENTION

It is, therefore, the primary object of the present invention to provide a safety interlock system which is designed for use with powered vehicles and the like that permits operation of the vehicles or like systems only by having full knowledge of a code which operates the interlock system.

It is another object of the present invention to provide a safety interlock system of the type stated which operates on the basis of a knowledge of a code operated by a plurality of manually operable input switches in order to open the safety interlock to permit operation of the vehicle or like system.

It is a further object of the present invention to provide a safety interlock system of the type stated which is uniquely designed in such manner that the encoding thereof cannot be determined by conventional metering techniques.

It is also an object of the present invention to provide a unique lock controlling circuit which is capable of controlling a lock on the hood of an engine compartment of a vehicle and which is released by introducing a proper code which also operates to enable energization of the engine of the vehicle.

It is yet another object of the present invention to provide a safety interlock system which incorporates an alarm system capable of generating an alarm when any one or more portions of the vehicle are unauthorizedly opened and when the engine system has not been energized pursuant to proper introduction of a preselected code.

It is an additional object of the present invention to provide a method of actuating a safety interlock system in such manner that the interlock system can only be opened by having knowledge of the encoding designed to open the interlock and which thereby obviates unauthorized removal of any device upon which the interlock system is utilized.

It is an even further object of the present invention to provide a method of actuating a safety interlock system having a circuit for operating a hood lock release upon introduction of the proper code into the interlock system.

It is another salient object of the present invention to provide a method of manufacturing an interlock system of the type stated which can be made at a low unit cost on a mass production basis.

With the above and other objects in view, my invention resides in the novel features of form, construction, arrangement and combination of parts presently described and pointed out in the claims.

GENERAL DESCRIPTION

The present invention relates in general to a unique safety interlock system to prevent theft or unauthorized removal of a vehicle having an engine system for powering the vehicle. This vehicle would also be equipped with an electrical component in an electrical circuit associated with the engine system, and where the electrical component is a part of the engine system.

The interlock system generally comprises a plurality of manually operable switch elements, each of which represents a separate indicium of a code for energizing the interlock system. When the interlock system is so energized, it will enable operation of the vehicle. The interlock system is enabled, only when a plurality of the switch elements have been activated in proper sequence to conform to the preestablished sequence of indicia of this code.

The interlock system also comprises means operatively associated with the switch elements to generate an electrical signal in response to actuation of the switch elements. A plurality of electronic latches are connected in operative relationship to the switch elements. Specifically, each particular latch is connected in operative relation to one of the particular switch elements and in such arrangement that the latches are switched to an upper state to permit an enabling signal in response to the electrical signals, only when the switch elements are operated in the proper sequence. Again, this proper sequence is that which conforms to the preestablished sequence of indicia of the code. A solid state circuit component is associated with the electrical component and is connected to the output of the latches, so that it is operable in response to the enabling signal to thereby permit operation of the electrical component.

The present invention may further be characterized in that the solid state circuit component has a silicon-controlled rectifier. Moreover, the latches may each be comprised of a pair of gating elements with a pair of inverters located at the output of the gating elements. One of these inverters is biased to a first state, and the other inverter is biased to an opposite state, and when the switch elements are operated in the proper sequence to enable generation of the enabling signal.

The electrical component which forms part of the vehicle may adopt the form of the starter solenoid of the vehicle, or otherwise, a fuel pump, which is electrically operable, or any other component which is electrically operable and forms part of the engine system of the vehicle. In this case, the interlock system may be operable with more than one electrical component in the vehicle, as for example, the starter solenoid and the fuel pump, or like component.

Each of the switch elements produces an electrical signal of duration equal to the time that any particular one of the switch elements is actuated. However, capacitor means are operatively connected to the outputs of these switch elements in order to compensate for the different durations of any electrical signals and also to compensate for any transients or noise therein.

The latches are preferably formed of gating elements as described above. Moreover, a pair of gating elements essentially comprise each of the latches, and these gating elements are cross-coupled. The gating elements are connected in a sequence, so that the first of the gating elements is biased to a set state and a second of the gating elements is biased to a reset state. The other gating elements in a first preestablished sequence are biased to a set state, and the remaining gating elements in a second preestablished sequence are biased to a reset state.

The safety interlock system of the present invention also includes a unique hood lock circuit which operates the lock located on a hood permitting entry into the engine compartment of the vehicle. The lock circuit also provides for other locks within the vehicle, as for example, into the trunk compartment and like portions of the vehicle.

The present invention also includes an alarm circuit which forms part of the safety interlock system. In this case, the alarm circuit is designed to generate an alarm when the proper preselected code is not introduced in such manner to enable all of the switch elements to be operated in proper sequence and when someone unauthorizedly attempts to enter the vehicle or any portion thereof.

The alarm circuit comprises a multivibrator which operates as a form of oscillator and biases a pair of transistors which operate in connection with a pair of sequential timers. The timers operate in conjunction with each other so as to trigger the alarm after a predetermined time delay.

BRIEF DESCRIPTION OF THE DRAWINGS

Figure 1:
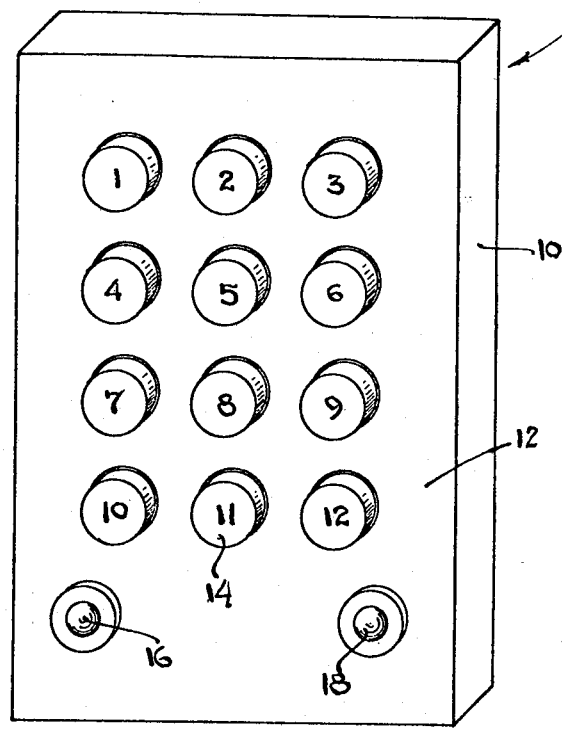
Figure 10A:
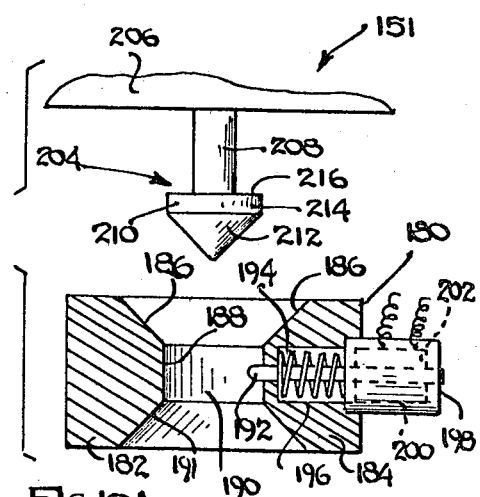
Figure 10B:
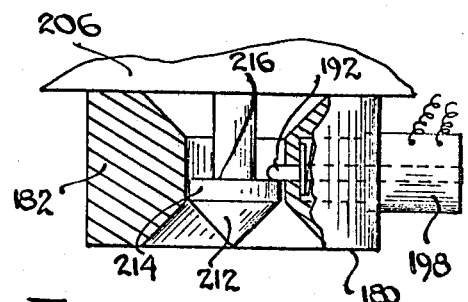
Figure 11A:
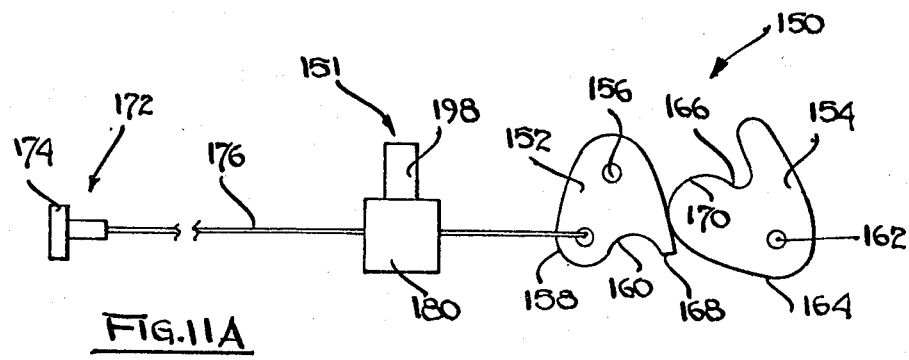
Figure 11B:
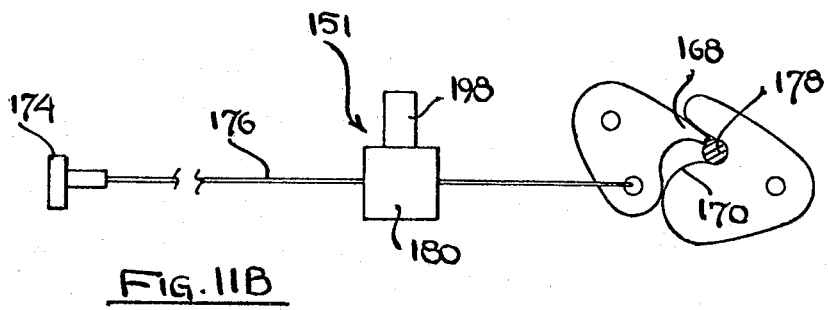
Figure 2:
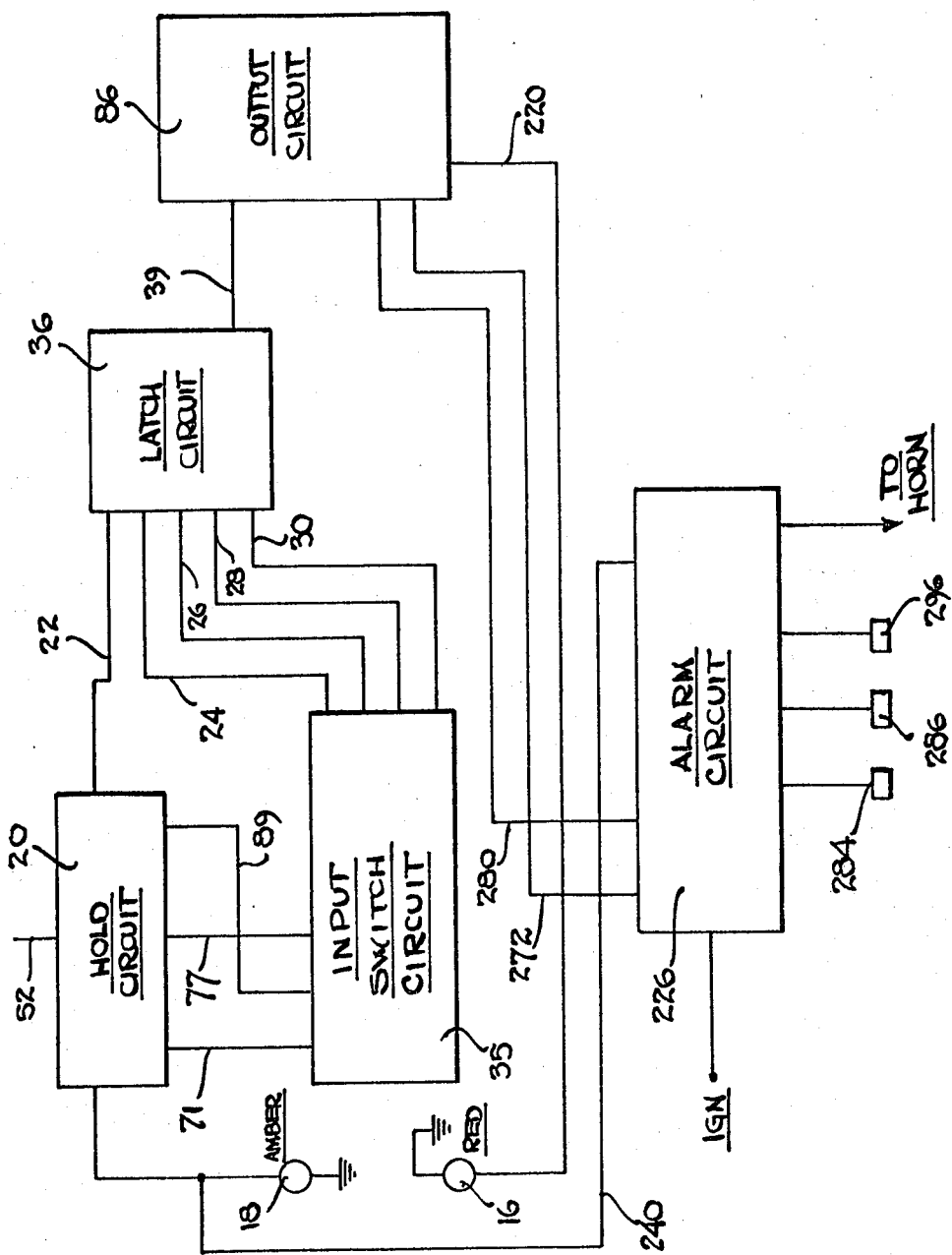
Figure 6:
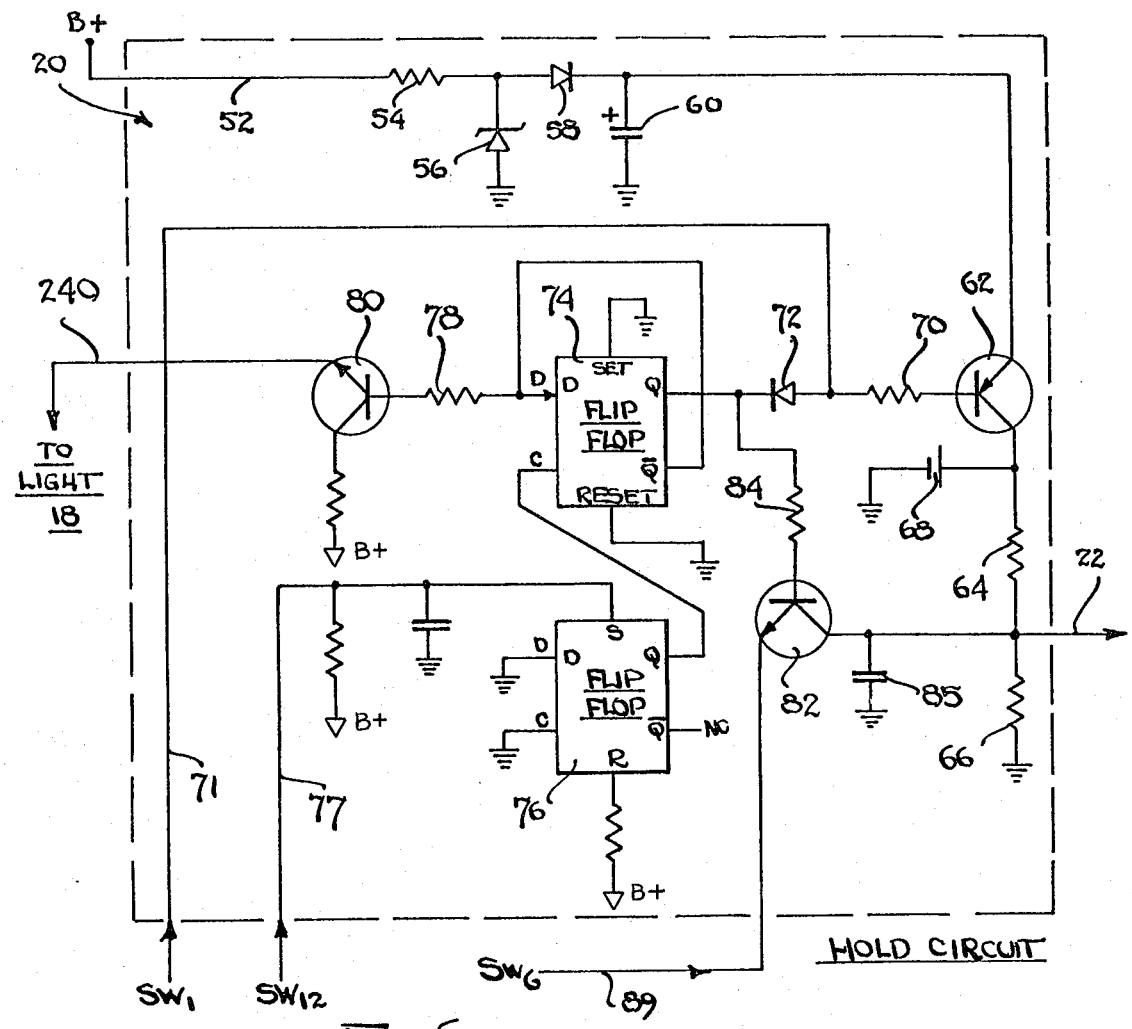
Figure 4:
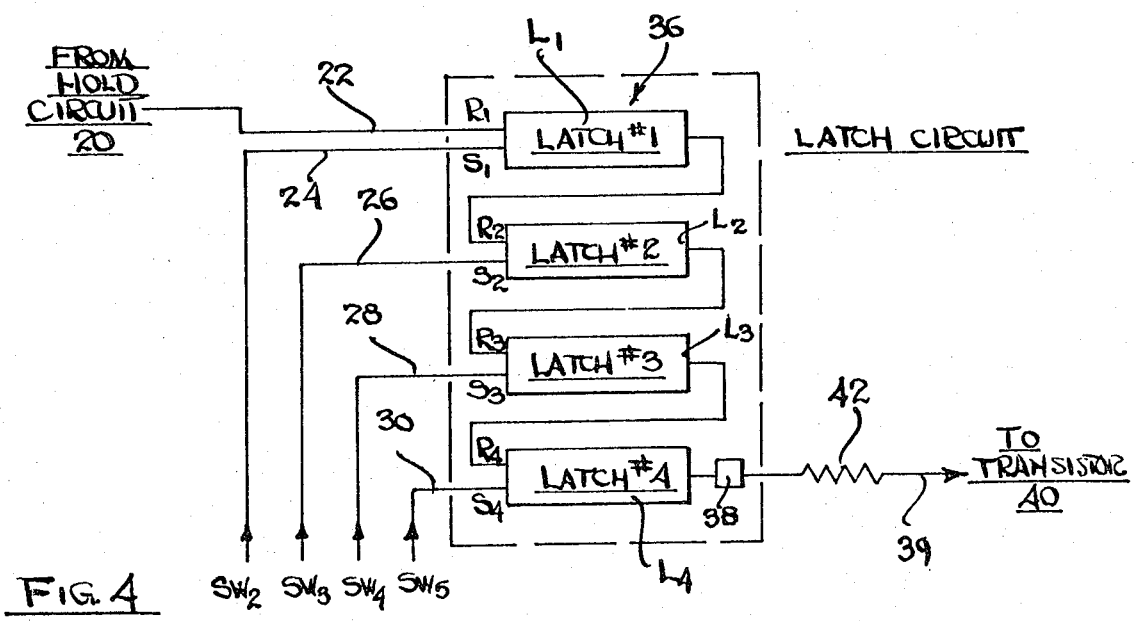
Figure 7:
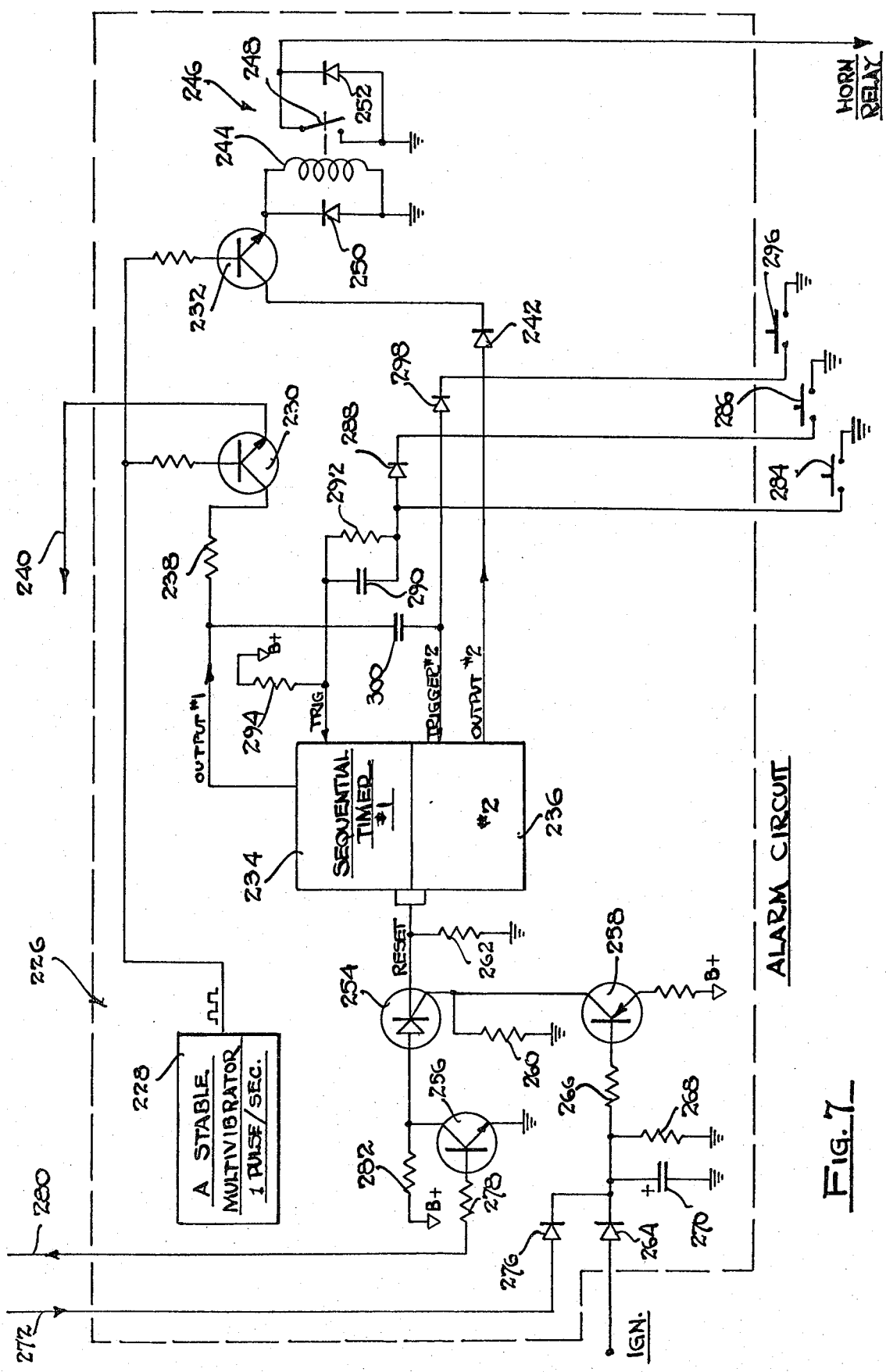

Having thus described the invention in general terms, reference will now be made to the accompanying drawings in which:

FIG. 1 is a front elevational view of a panel including a plurality of manually operable switches forming part of the safety interlock system of the present invention;

FIG. 2 is a schematic circuit view showing the general components of the safety interlock system forming part of the present invention;

FIG. 3 is a schematic view showing the input switch circuit forming part of the safety interlock system of the present invention;

FIG. 4 is a schematic circuit view showing the latch circuit forming part of the safety interlock system of the present invention;

FIG. 5 is a schematic view showing a combination of the input switch circuit and the gating circuitry forming part of the latch circuit of the safety interlock system of the present invention;

FIG. 6 is a schematic view of the electrical circuitry of a hold circuit forming part of the safety interlock system of the present invention;

FIG. 7 is a schematic view of the electrical circuitry of an alarm circuit forming part of the safety interlock system of the present invention;

FIG. 8 is a schematic view of the electrical circuitry of an output circuit forming part of the safety interlock system of the present invention;

FIG. 9 is a schematic view of a truth table for the latches used in the interlock system of the present invention;

FIG. 10A is a composite vertical sectional view showing a lock release mechanism operable by the safety interlock system of the present invention and in the unlocked position;

FIG. 10B is a vertical sectional view of the lock release mechanism of FIG. 10A in the locked position;

FIG. 11A is a schematic side elevational view showing a lock release mechanism operable by the safety interlock system and operating a conventional lock device with the lock device in the open position; and FIG. 11B is a schematic side elevational view, similar to FIG. 11A, and showing the lock release mechanism preventing opening of the lock device so that the lock device is in the closed or locked position.

DETAILED DESCRIPTION OF A PREFERRED EMBODIMENT

Referring now in more detail and by reference characters to the drawings, A designates a safety interlock system which is constructed in accordance with and embodies the present invention, and which is specifically designed to be utilized in automotive vehicles and like devices. This safety interlock system is specifically designed to prevent theft or other unauthorized removal of automotive vehicles, although the interlock system could be used in a wide variety of applications, including the unauthorized removal of other forms of vehicles, e.g. boats, airplanes and the like. In addition, the interlock system could be uniquely designed to prevent unauthorized tampering with other devices by incorporation of the safety interlock system of the present invention.

The safety interlock system A of the present invention generally comprises a small casing 10, which may be mounted in a convenient location within the vehicle, as for example, on the dashboard thereof. The casing 10 includes a face plate 12, with a plurality of manually operable push button switches. Twelve such switches are illustrated, and these particular switches are designated by code indicia 1 through 12. The switch $SW_{12}$ functions as a hold switch or so-called "override" switch. Five of the switches are used to introduce the code and the others are provided in the event that the system is to be custom designed with additional features requiring switches. However, it should be observed in connection with the present invention that any number of input switches may be employed.

The face plate 12 is also provided with a first light-emitting diode, or similar indicating light 16, which indicates that the switches of the system have been properly operated in sequence, in order to permit energization of the vehicle motor. A second light-emitting diode, or similar light source 18, is also mounted on the face plate 12, which indicates that the safety interlock system has been temporarily bypassed, in a manner to be hereinafter described in more detail. Moreover, a main switch (not shown) may also be employed if desired and mounted on the face plate 12. This main switch could be connected to the circuitry in a manner to permit energization or deenergization of the entire interlock system A.

Referring to FIG. 3 of the drawings, it can be observed that the twelve push button switches are designated as $SW_1$, $SW_2$ ... $SW_{12}$ and correspond to the switches 1–12 on the face plate. In this case, and as indicated above, only five of the switches have been selected for introducing a five-digit input code, although any number of switches could be used for introducing the input code, that is, less than five or more than five switches may be used in order to generate the desired indicia code.

Each of the input switches is illustrated as push button switches, and these switches are preferably manually operable and generate an electrical signal only for the duration of the time that they are pressed. For this purpose the switches would be normally biased to the opened or "off contact" position. One terminal of each of these switches is connected to ground in the manner as illustrated in FIG. 3 of the drawings. In this case, the ground would adopt the ground condition of the engine-operated vehicle.

Since only five switches are effectively employed in this embodiment for generating the indicia code to open the interlock system, the remaining switches, with the exception of the $SW_{12}$ switch, are not utilized. When these remaining switches are actuated, they will generate a reset signal in accordance with the circuit more fully illustrated in FIG. 3 of the drawings.

The first switch $SW_1$ is connected to a hold circuit, or so-called "override" circuit, 20 (and which is hereinafter described in more detail). The hold circuit 20 is provided with an output 22 which is connected to a reset input $R_1$ of a first latch designated as $L_1$. The second switch $SW_2$ is provided with an output 24 which is introduced into a set input $S_1$ of a first latch $L_1$. The third switch $SW_3$ is provided with an output 26 which is connected to a set input of a second latch $L_2$. The output of the latch $L_1$ is introduced into the reset input $R_2$ of the latch $L_2$. The fourth switch $SW_4$ is provided with an output 28 which is connected to a set input $S_3$ of a third latch $L_3$. The output of the second latch $L_2$ is introduced into a reset input $R_3$ of the third latch $L_3$. Finally, the fifth $SW_5$ is provided with an output 30 which is introduced into a set input $S_4$ of a fourth latch $L_4$. Again, the output of the latch $L_3$ is introduced into a reset input $R_4$ of the latch $L_4$.

Capacitors 32 are connected across the output lines 24, 26, 28 and 30 and are grounded and resistors 34 are also connected to the same output lines and also to B+ in the manner illustrated in FIG. 3. These capacitors 32 are designed to smooth out any spikes or noise which result from actuation of any of these particular switches. It can be observed that the switches are simple push button-operated switches, where the signal may be of any duration depending upon the time that the operator holds the switches in the contact position. However, it has been found in connection with the present invention that it is not necessary to employ a Schmidt trigger, or any other form of multimodulator, in order to eliminate pulses of different lengths resulting from holding the switches in the contact positions for different time periods. The capacitors 32 have been found to be highly effective in eliminating the noisy signals which would otherwise result therefrom. The resistors 34 effectively serve as "pull-up" resistors and operate in conjunction with the capacitors 32 which are capable of compensating for the capacitance in the lines to the various latches. The various switches $SW_1$ through $SW_{12}$ along with the capacitors 32 and resistors 34 and the respective output lines from the switches constitute an input switch circuit 35.

The latches $L_1$ through $L_4$ comprise a latch circuit 36. The operation of each of these latches $L_1$–$L_4$ is more fully described hereinafter. However, it can be observed that these particular latches are available in the form of a single integrated circuit chip. Moreover, each of these latches $L_1$–$L_4$ effectively functions as a flip-flop, and each of these flip-flops is comprised of a plurality of NAND gates in a manner to be hereinafter described in more detail.

The output of the latch $L_4$ is introduced into an inverter circuit 38 which is used in the arrangement of the flip-flops disclosed herein. The inverter circuit 38 is described in more detail hereinafter. However, it should be understood that the inverter circuit 38 could be eliminated depending upon the type of latch arrangement used and the arrangement of flip-flops or other multi-state units forming part of the latches. In any event, the circuit is described herein with the inverter circuit 38 due to the latch arrangement. In this respect, the inverter circuit 38 is considered to be part of the latch circuit 36. The inverter circuit has present a latch output circuit line 39 which is connected to an output circuit as hereinafter described. The true inputs to the latch circuit 36 are shown in FIG. 5.

Referring now to the arrangement of the latches $L_1$–$L_4$, as illustrated in FIG. 5, it can be observed that these latches are connected in such manner that the inverter circuit 38 provides an enabling signal at its output in accordance with the truth table set forth in FIG. 9 of the drawings. In this case, the Q representation is that output from each of the latches $L_1$–$L_4$.

The actual operation of the latches $L_1$–$L_4$ is more fully described in connection with the gating circuit illustrated in FIG. 5 of the drawings. It can be observed from FIG. 9 of the drawings how the various latches operate in order to generate an enabling signal. When the switch $SW_1$ is actuated, the reset to the latch $L_1$ creates a "one" signal, and when the switch $SW_2$ is actuated a "one" or set input is generated to the latch $L_1$. Accordingly, the output will have no change and will generate a "one" signal. When the switch $SW_2$ is actuated, the reset input to the latch $L_2$ will be a "one" signal and the set input will be a "zero" signal, and consequently the output of the latch $L_2$ is a "one" signal. In this way, the reset input to the latch $L_3$ will be a "zero" input and the set input will be a "zero" signal so that the output of the latch $L_3$ is a "zero" signal. Finally, when the switch $SW_5$ is actuated, the reset input to the latch $L_4$ is a "zero" input and the set input is also a "zero" input so that the output Q of the latch $L_4$ is a "one" output. In this way, an enabling signal will be generated at the output of the latch $L_4$.

The output of the latch $L_4$ and the inverter 38 is effectively connected to the light-emitting diode 16 in order to indicate when a correct coding has been introduced into the circuit by means of proper actuation of the various push button switches 14 in proper sequence. If this occurs, the light-emitting diode 16 will be energized.

In accordance with the above-outlined construction, it can be observed that each of the latches $L_1$–$L_4$ must be operated in sequence with respect to five correct push-button switches which are operated in sequence. In this case, it has been arbitrarily established that the switches $SW_1$–$SW_5$ must be operated in proper sequence in order to operate each of the latches $L_1$–$L_4$. Thus, when each of these switches are so operated in the proper sequence, an enabling signal will be generated at the output of the invertor circuit 38 in order to permit a transistor 40 to operate the electrical components of the vehicle. It can also be observed that if any one switch was pressed out of sequence, the particular latch associated therewith would be reset. Accordingly, the device would be inoperative until the sequence was again started such that all switches were operated in proper sequence in order to regenerate the enabling signal.

It should be observed that switches $SW_1$ through $SW_5$ were arbitrarily selected, and any five of the individual switches $SW_1$–$SW_{12}$ could be selected in an arbitrary random manner. Again, five individual switches have been selected for generating the proper input code, although this is also an arbitrary number of switches and any number thereof could be employed, as for example, four, six or seven. In like manner, it could also be observed that if more switches were required in order to generate additional input code indicia, then additional latches would also be required. These additional latches would also be connected in the same manner as illustrated in FIG. 5.

The latches $L_1$–$L_4$ are primarily flip-flops as indicated above. Again, these flip-flops are comprised of a pair of NAND gates, and the actual operation with respect to the setting and resetting of these latches is hereinafter described in more detail, with reference to the particular NAND gates forming part of these latches.

FIG. 5 more fully illustrates the latches present in the form of NAND gates, and in this case it can be observed that the first latch $L_1$ is comprised of a pair of cross-coupled NAND gates $G_1$ and $G_2$. The output of the gate $G_1$ is introduced as an input to the gate $G_2$. In addition, the input to the gate $G_1$ is introduced to an inverting NAND gate $I_1$. In like manner, the output of the gate $G_1$ is connected to a gate $G_3$, and the output of this gate $G_3$ is connected to an input of a gate $G_4$ where the gates $G_3$ and $G_4$ form the second latch $L_2$. The third latch comprises gates $G_5$ and $G_6$ where the output of the gate $G_4$ is introduced as an input to the gate $G_5$. In addition, outputs of each of the gates $G_5$ and $G_6$ serve as inputs to the other of the gates. The latch $L_4$ is comprised of gates $G_7$ and $G_8$. The gates $G_7$ and $G_8$ also have outputs connected to the opposite of the gates and, in addition, the gate $G_7$ receives an input from the output of the gate $G_6$. Again, it can be observed that the gate $G_4$ has an output to the inverting NAND gate $I_1$ and the gate $G_6$ and the gate $G_8$ have outputs to the inverter circuit 38. The inverting circuit comprises an inverting NAND gate $I_1$. Finally, the inverting NAND gate $I_1$ has an output introduced into the four inputs of a second inverting NAND gate $I_2$ forming part of the circuit 38. The output of this NAND gate $I_2$ is then introduced through a resistor 42 into the transistor 40.

With respect to FIG. 5, it can also be observed as to how the various input switches are connected to the NAND gates in order to introduce the set signals into these respective NAND gates. Moreover, it can also be observed, by reference to FIG. 5 that a ground line 44 from the inverting NAND gate $I_2$ is connected to the case 10 in order to ground the case.

When all of four NAND gates, one from each of the respective four latches, are high, and introduce a "one" signal into the inverting gate $I_1$, this latter gate will become low. As this occurs, the output from the second inverting gate $I_2$ will become high. At the start, before any of the switches is actuated, all of the gates $G_1$ through $G_8$ are in the reset position. When the output of gate $G_1$ becomes low, then the output of gate $G_2$ will become low. In this case, when the switches are actuated in proper sequence, gates $G_3$, $G_5$ and $G_7$ will become high, and gates $G_4$, $G_6$ and $G_8$ will become low. Thus, when the first gate $G_1$ is pulsed and goes high, not only does it cause the gate $G_2$ to become low, but also sends a "one" signal to the inverting gate $I_1$. The output of gate $G_3$ will hold gate $G_5$ in a low position.

Diodes 46 and 48 may also be interposed in the lines to the inputs of gates $G_5$ and $G_7$ in the manner as illustrated in FIG. 5. These diodes are designed to prevent holding all of the buttons down simultaneously in order to attempt to set all of the gates.

The hold circuit 20 is provided with an input line 52 which is connected to the battery or other source of electrical power of the vehicle. The input line 52 is provided with a current limiting resistor 54 and a zener diode 56 connected to ground which prevents excess voltage from being introduced into the safety interlock system. Moreover, a diode 58 is also located in the input line 52 and is designed to prevent damage to the system in the event that one reverses the leads of the ignition system or otherwise the safety interlock system. Further, a filtering capacitor 60 is also located in the input line 52 in the manner as illustrated in FIG. 6 of the drawings. The input line 52 actually serves as a B+ conductor or line.

The input line 52 is connected to the emitter of a PNP transistor 62 forming part of the hold circuit 20 of the present invention. The collector of the transistor 62 is connected to a resistor 64 and a resistor 66, the latter of which is grounded in the manner as illustrated in FIG. 6. Moreover, the collector of the transistor 62 is connected to a capacitor 68 which is also grounded in the manner as illustrated in FIG. 6. As the first input switch $SW_1$ is pressed, the transistor 62 will be biased on, thereby charging the capacitor 68. The capacitor 68 can be discharged through the pair of resistors 64 and 66.

By reference to FIGS. 3 and 6, it can be observed that the first switch $SW_1$ has its output connected to the base of the transistor 62 through a resistor 70 by means of a switch input line 71. In addition, the base of the transistor 62 is connected through a didoe 72 to the Q output of a D-type flip-flop 74. The flip-flop 74 is a toggle flip-flop which effectively functions as a divide-by-two flip-flop. The D input of the flip-flop 74 is connected to the $\overline{Q}$ output of the flip-flop 74. Moreover, the set and reset positions of the flip-flop 74 are both grounded.

The flip-flop 74 has its C input connected to the Q output of a second D-type flip-flop 76 which serves as a trigger flip-flop. The reset terminal of the flip-flop 76 is connected to a suitable source of electrical current as illustrated, e.g., the B+ line of the circuit, and the C and D terminals of the flip-flop 76 are both grounded. The set terminal of the flip-flop 76 is connected to the switch $SW_{12}$, as illustrated in FIG. 6 of the drawings by means of a switch input line 77. The D terminal of the flip-flop 74 is also connected through a resistor 78 to the base of an NPN transistor 80, the collector of which is connected to a B+ power source. The emitter of the transistor 80 is connected to the yellow or amber light-emitting diode 18 on the casing 10.

In this respect, the reset terminal of the flip-flop 76, as well as several other components hereinafter described, are connected to the battery power, either directly, or via the B+ line, and this connection is shown by an inverted delta, namely ($\nabla$). However, is should be understood this designation is only for purposes of clarity and in actual construction such battery connections would be made in common.

If the push-button switch $SW_{12}$, which functions as a hold switch, is pressed, the flip-flop 74 will be toggled and the output of this flip-flop will be low and thereby bias the transistor 62 high. The transistor 62 will be biased to the on position even when the hold switch $SW_{12}$ is released. In like manner, if the proper push-button switches SW were pressed in their proper sequence to introduce a preselected code and the hold push-button switch $SW_{12}$ was then pressed, the amber light 18 would also be energized.

The two outputs of flip-flop 74 are complementary such that one is always high when the other is low. The Q output of flip-flop 74 is capable of energizing the transistor 62 and the $\overline{Q}$ output of flip-flop 74 will energize the transistor 80. The two flip-flops 74 and 76 are needed in combination in order to slow down the energizing signal and to take up point bounce conditions. A one-shot delay could be substituted for one of the flip-flops in order to perform this purpose, although the one-shot delay would be a bit more complex and more costly. When the NPN transistor 80 is biased to the on condition, the amber light will be energized as indicated previously to indicate that the safety interlock system is in the hold mode.

By further reference to FIG. 6, it can also be observed that an NPN transistor 82 is provided and has the collector thereof connected between the junctions of the resistors 64 and 66 and hence to the collector of the transistor 62. The base of the transistor 82 is connected through a resistor 84 to an output, e.g., the Q terminal of the flip-flop 74 in the manner as illustrated in FIG. 6. Moreover, a capacitor 85 is connected to the collector of the transistor 82 and is also grounded. The emitter of the transistor is also connected to the push-button switch $SW_6$ by means of a switch input line 89.

It can be observed that the hold circuit 20 not only operates to place the entire safety interlock system into the hold mode, but also serves as an input of power to the latch circuit 36. The transistor 80 is designed to enable the overriding of the entire safety interlock system for purposes of parking or maintenance of the vehicle. Thus, the operator of the vehicle can leave the vehicle in the hands of maintenance personnel or parking personnel or similar agents who are authorized to operate the vehicle without disclosing the particular code which must be introduced in order to operate the vehicle.

When the hold switch $SW_{12}$ is pushed, after the proper preselected code has been entered into the latch circuit 36 to generate an enabling signal, the safety interlock circuit can be overridden. If the mechanic or the parking attendant accidentally touches any of the keys on the key pad, such as the switches $SW_1$ through $SW_5$, or the switch $SW_{12}$, nothing will happen. However, in absence of the transistor 82, if the attendant who is authorized to use the vehicle happened to contact any of the reset switches, as for example, the switches $SW_7$ through $SW_{11}$, it would be necessary to introduce the code again in order to operate the vehicle.

When the output of the transistor 82 is low, it will not conduct and shut off. In this way, if one contacts any of the reset push-buttons, they will not conduct through the hold circuit. When the output of the transistor 82 is high, normal conduction will occur and, therefore, contact of the reset push button switches, namely the switches $SW_7$ through $SW_{11}$, will require introduction of the preselected code again in order to operate the vehicle.

The resistor 42 and NPN transistor 40 form part of the output circuit 86, as illustrated in FIG. 8. The collector of the NPN transistor 40 may be connected through a zener diode (not shown) to the 12-volt source of electrical current if desired. The zener diode would essentially serve to limit the input current to the gate of the transistor 40 to, for example, 10 volts, in order to further protect the gate of the silicon-controlled rectifier 94, as hereinafter described.

The emitter of the transistor 40 is connected through a resistor 88 and a diode 99 in an output line 92 to the gate of a silicon-controlled rectifier 94, the rectifier 94 also receiving a 12-volt signal $V_{cc}$ from the ignition system of the electrical circuit forming part of the engine system of the vehicle. The output of the silicon-controlled rectifier 94 is thereupon connected to a starter solenoid coil 96, forming part of the engine of the vehicle, the opposite terminal of the coil being grounded in the manner as illustrated in FIG. 8. In addition, the diode 90 is connected to a resistor 98 which is grounded.

It can be observed that when a "high" or otherwise a "one" signal is present at the output of the latch circuit 36, the transistor 40 will be energized, thereby permitting current to pass through the diode 90 to the gate of the silicon-controlled rectifier 94. In this case, the diode 90 acts as a form of a buffer to protect the gate of the silicon-controlled rectifier 94.

The interlock system of the present invention may also be connected to other electrically operable components of the vehicle, or, otherwise, to other components of the vehicle in addition to the starter solenoid. For example, in those vehicles which employ electrically operable fuel pumps which would have a coil, as designated by reference numeral 106 in FIG. 8 of the drawings, the interlock system could operate with these components as well. In this case, the emitter of the transistor 40 is connected through a resistor 100 and a diode 102 to the gate of a silicon-controlled rectifier 104. This silicon-controlled rectifier 104 is, in turn, connected to one terminal of the fuel pump coil 106 and the opposite terminal of which is grounded. Again, the silicon-controlled rectifier 104 will control operation of the fuel pump coil 106 when energized, and the diode 102, along with the resistor 100, will protect the gate of the silicon-controlled rectifier 104 from excessive current levels.

The output circuit also includes a second output line 108 connected to the emitter of the transistor 40 with a resistor 110 and a diode 112, which are similar to and serve the same functions as the resistor 88 and the diode 90. The output line 108 is connected to one base of another silicon controlled rectifier 114, the other base of which is grounded. In this respect, it can be observed that a resistor 116 is connected across the two bases of the silicon control rectifier 114. The emitter of the rectifier 114 is connected to a coil 118 having a diode 120 connected in parallel thereacross.

The coil 118 is designed to serve as an auxiliary function coil such that it forms part of a relay so that other components may be connected to the safety interlock system. In this case, it can be observed that a double-pole-double-throw switch 122 operates in conjunction with the relay 118 and is provided with a plurality of outputs 124. In this way, the safety interlock system could be altered to accommodate various other features or otherwise could be connected to other components forming part of the vehicle. This feature also provides a greater degree of utility of the safety interlock system.

The output circuit 86 also includes a lock release control circuit schematically designated as 126. The lock release control circuit 126 is further comprised of a silicon controlled rectifier 128, the emitter of which is connected to the lower end of the coil 118 and may also be connected to the ignition start switch to receive a 12-volt ignition current therethrough. In addition, the base-1 of the silicon controlled rectifier 128 is connected through an input line 130 to the emitter of the transistor 40 and contains a diode 142 and a resistor 144. The didoe 142 essentially serves the same function as the diode 90 and the resistor 144 essentially serves the same function as the resistor 88. Moreover, this base-1 of the silicon controlled rectifier 128 is connected through a resistor 146 which is grounded. The other base, namely the base-2, of the rectifier 128 is connected to a hood-lock release solenoid 148, the latter of which is grounded.

In the present invention, a lock release mechanism 151 is employed and is operated by the safety interlock system in order to operate a conventional lock release mechanism 150. In this case, the lock release mechanism 151 would only permit opening of the conventional lock in the event that the proper code has been introduced into the safety interlock system through the proper actuation of the input switches in sequence. While the lock release mechanism is described in conjunction with a conventional hood lock, it should be understood that the lock release mechanism could be used in conjunction with any lock on any portion of the vehicle in order to permit access to that portion of the vehicle.

FIG. 11A illustrates a conventional hood lock 150 used in conjunction with a hood lock release mechanism 151 and, in this case, the conventional hood lock includes a pair of camming plates 152 and 154 which are often referred to as camming "discs". These camming discs cooperate to serve as a lock and are, therefore, often referred to as "locking" discs. The first camming disc 152 is shown as being pivoted on a pivot pin 156 with a first camming surface 158 and having a recess 160. The second camming disc 154 is pivoted on a pivot pin 162 and includes a camming surface 164 mating with the camming surface 158 and also includes a second recess 166. In the position as illustrated in FIG. 11A, the lock device is in the open position, such that the hood or other portion of the vehicle can be opened.

Referring now to FIG. 11B, it can be observed that the conventional lock device of the vehicle is in the locked position, such that the hood or other portion of the vehicle could not be opened without releasing the same from the interior passenger compartment of the vehicle. In this case, it can be observed that the first and second camming discs 152 and 154, respectively, are rotated to a position such that a first finger 168 on the first camming disc extends into the recess 166 on the second disc 154. In like manner, a second finger 170 on the second camming disc 154 extends into the recess 160 on the first camming disc 152. In this way, the lock device 150 cannot be opened until the same is released through a release mechanism 172 in the passenger compartment of the vehicle.

Referring again to FIGS. 11A and 11B, it can be observed that the release mechanism includes a handle 174 which is located in the passenger compartment of the vehicle and connected to the camming disc 152 by means of a cable 176. In the absence of the lock release mechanism 151, the handle 174 can be pulled in order to shift the camming plates 152 and 154 from the position as illustrated in FIG. 11B to the position as illustrated in FIG. 11A, thereby permitting opening of the hood of the vehicle. More specifically, it can be observed that the hood of the vehicle includes a locking pin 178 which is located in the recess 166 in the locked position, but which can be removed from the recess 166 when the camming discs 152 and 154 are shifted to the opened position as illustrated in FIG. 11A of the drawings. Thus, the lock device 150 as illustrated in FIGS. 11A and 11B can be operated without the lock release mechanism 151, as illustrated in a conventional manner.

However, in the preferred aspect of the present invention, the lock release mechanism A is included so as to prevent the opening of the hood lock 150, that is from being shifted to the closed position as illustrated in FIG. 11B to the opened position as illustrated in FIG. 11A without introduction of the pre-selected code as described above and as hereinafter described in more detail. Thus, if the proper preselected code has not been entered, the hood lock release mechanism 151 would not be energized to permit the shifting of the cam plates 152 and 154 in FIG. 11B to the opened position as illustrated in FIG. 11A.

FIG. 10A illustrates a lock release mechanism 151 which is used in conjunction with the safety interlock system. In this case, the lock release mechanism 151 operates in connection with a conventional hood lock 150 in order to permit opening of the same, such that the camming discs 152 and 154 are shifted to the position as illustrated in FIG. 11A upon energization of the lock release mechanism 151 as hereinafter described.

The lock release mechanism 151 is comprised of an outer housing 180 having a pair of spaced apart opposed camming plates 182 and 184 and each of which are provided with opposed, upwardly presented and downwardly and inwardly converging camming surfaces 186. The camming surfaces 186 merge into relatively parallel spaced apart surfaces 188 located on the respective camming plates 182 and 184 and which in combination define a plunger opening 190. The spaced apart, relatively parallel surfaces 188 also merge into diverging, outwardly extending camming surface 192.

One of the camming plates 184 is provided with a locking pin 192 which extends toward the camming surface 188 in the manner as illustrated in FIG. 8. The locking pin 192 is normally biased into a lock position as illustrated in FIG. 10 by means of a coil spring 194 so that it extends into the opening 190. The coil spring fits within a recess 196 so as to bias the locking pin 192 to the outward position or locking position as illustrated in FIG. 10B of the drawings. The lock release mechanism 151 is also provided with a solenoid 198 which contains a solenoid coil 200 and operable through conductor means 202. When current is introduced into the coil 200, it is energized and thereby magnetically urges the locking pin 192 to the retracted position so that it is removed from the space 190. Deenergization of the coil 200 permits the locking pin 192 to be extended into the locking space 190 by action of the compression spring 194.

A locking plunger 204 operates in conjunction with the lock release mechanism 151 and is mounted on the interior surface of a hood 206 as illustrated in FIG. 10A of the drawings. The plunger 204 is comprised of a shank 208 and an enlarged locking head 210, the latter having camming surfaces 212 which merge into a relatively flat annular wall 214. In this way, the plunger 204 extends downwardly into the opening 190 and the camming faces 212 are capable of biasing the locking pin 192 inwardly against the action of the compression spring 194. After the plunger is shifted to its lowermost or seated position, the locking head will be below the level of the locking pin 192. In this latter position, the locking pin 192 will be extended outwardly by the action of the compression spring 194 so as to engage a locking shoulder 216 on the upper surface of the head 210, and thereby secure the hood 206 in a locked position.

Connected to the emitter of the NPN transistor 40 is an output line 220 having a resistor 222 and a diode 224 connected in series therein. The resistor 222 and the diode 224 serve the same function as the resistor 88 and the diode 90, respectively. In this respect, each of the resistors 88, 110 and 222 would have the same resistive characteristics and, in like manner, the diodes 90, 112 and 224 would have the same characteristics. The output line 220 is connected to the red light 16 on the face plate of the casing.

The present invention includes an alarm circuit 226 comprised of an A-stable multivibrator 228 capable of generating timing pulses at a specific rate, as for example, two pulses per second. The multivibrator 228 which serves as a pulse generator has outputs to the base of an NPN transistor 230 and the base of an NPN transistor 232.

The alarm circuit 226 is also comprised of a first sequential timer 234 and a second sequential timer 236. The timer 234 has a first output connected to the collector of the transistor 230 through a current limiting resistor 238. The emitter of the transistor 230 is connected through an output line 240 to the amber light 18 and to the emitter of the transistor 80 forming part of the hold circuit. In like manner, the second trigger 236 has an output connected through a diode 242 to the collector of the transistor 232.

The emitter of the transistor 232 is connected to a coil 244 of a relay 246 having a relay switch 248 operable thereby. One terminal of the coil 244 is grounded in the manner as illustrated. In addition, flyback diodes 250 and 252 are connected across the coil 244 and the switch 248 in order to prevent transient currents through the inductive system. The output of the switch 248 is connected to the conventional horn of the vehicle or any type of audible or visual alarm system, as for example, a siren or the like.

The sequential timers 234 and 236 are reset by a silicon controlled rectifier 254 which is, in turn, actuated by an NPN transistor 256, with the collector of the transistor 256 being connected to the emitter of the silicon controlled rectifier 254. The base-1 of the rectifier 254 serves as the reset input to the two sequential timers. The silicon controlled rectifier 254 is triggered by means of an PNP transistor 258 with the base-2 of the rectifier 254 being connected to the collector of the transistor 258. The emitter of the transistor 258 is connected to the battery or similar 12-volt power source through a B+ connection. In addition, the collector of the transistor 258 and the base-2 of the rectifier 254 are grounded through a resistor 260. Moreover, the base-2 of the rectifier 254 is similarly grounded through a resistor 262.

The base of the transistor 258 is connected to the ignition through a diode 264 and a current limiting resistor 266. The resistor 266 operates in conjunction with a resistor 268 which is grounded, and a capacitor 270, the negative terminal of which is grounded. The transistor 258 also receives an input through a conductor 272 which is connected to the switch designed to generate an alarm when a particular access portion of the vehicle is opened, as for example, a hood lock switch 274, which forms part of the output circuit. In this case, it can be observed that the switch 274 is also connected to the battery or similar 12-volt source of power.

In essence, any switch or any series of switches could be utilized for connection to the conductor 272 in order to generate an alarm when any access portion of the vehicle was improperly opened. It can also be observed that a diode 276 is located in the conductor 272 in order to prevent back flow of current.

The base of the transistor 256 is connected through a resistor 278 to an output line 280 which is, in turn, connected to the emitter of the transistor 40 in the output circuit. In this way, the transistor 256 can be triggered when an enabling pulse is generated through the various latches $L_1$ through $L_4$. In addition, the collector of the transistor 256 is connected through a resistor 282 to the battery or similar 12-volt source of power, e.g., a B+ conductor. In this respect, it should be observed that the various components in the circuit which receive power from the battery could receive the power from a separate power source or individual sources for that matter. In addition, while the circuit of the present invention is designed to operate on a 12-volt source of power, it should be obvious that any voltage could be utilized with the mere changing of the relative capacities of the various circuit components.

The first sequential timer 234 receives a trigger signal from a first trigger switch 284 or a second trigger switch 286, both of which are grounded. A diode 288 is connected across the trigger switches 284 and 286. In addition, a capacitor 290 and a resistor 292 are connected in series with respect to the input of the timer 234 and in parallel relationship with respect to each other. Moreover, the trigger input to the sequential timer 234 is provided with a resistor 294 which is also connected to the power source of the vehicle. The second timer 236 receives a trigger input from a trigger switch 296, the latter of which also has a terminal grounded and with a diode 209 located in the input line to prevent back flow of current. Moreover, a capacitor 300 is connected across the first output of the sequential timer 234 and the input of the sequential timer 236, in the manner as illustrated in FIG. 7.

It can be observed that the multivibrator which generates the pulses is connected to both of the transistors 230 and 232. The timer 234 can be triggered by either of the trigger switches 284 or 286. In this respect, the trigger switch 286 is connected to the door switch on the automotive vehicle, as for example, the switch which turns on the light in the cab of the vehicle. The switch 284 is connected to a motion detector. Thus, for example, the motion detector could be a reed switch such that if one attempts to jack-up the vehicle in order to steal the tires or other components, the reed switch or the motion detector can also initiate the alarm.

When the first sequential timer 234 is triggered, it generates a high output over the output line to the transistor 230, thereby turning on the transistor 230. In this case, the transistor 230 is also continuously pulsed by the multivibrator, as for example, twice a second. This will also cause the amber light 18 to flash two times per second in order to show that the alarm circuit is working. The sequential timer 234 is constructed with a time delay, as for example, a 17-second delay cycle and thereafter will trigger the second sequential timer 236. In this case, the output of the second sequential timer 236 is connected to the transistor 232 which is also pulsed twice a second by the multivibrator and will cause the relay 246 to open and close two times per second. The second timer 236 will thereupon initiate the horn or siren relay when its output is high.

The first timer 234 charges up the capacitor 290 and, upon discharge through the resistor 292, will permit triggering of the sequential timer. In this way, the delay of the sequential timer 232 permits the operator of the vehicle to enter and leave the vehicle or to enter other access portions thereof without initiating the alarm. In this respect, the amount of time can vary from 17 seconds to any amount of desired time delay. In like manner, if no time delay is desired, then the outputs can be connected directly to the second sequential timer 236.

When the ignition is on, and a current flow occurs through the capacitor 270, the transistor 258 will be biased to the off condition. The timers are off when the reset line to the timers from the silicon controlled rectifier 254 is low. Contrariwise, when the transistor 258 is triggered, the silicon controlled rectifier 254 will allow current to flow from the battery and turn the reset line high. Thus, when the engine is running pursuant to introduction of the preestablished code through the input switches $SW_1$ through $SW_{12}$, the capacitor 270 will charge and the transistor 258 will be biased off. In like manner, when the engine is not running, the capacitor 270 will discharge through the resistor 268 and the transistor 258 will be turned high, thereby turning on the silicon controlled rectifier 254.

In this way, an exit delay is provided with the capacitor 270 in order to permit the driver of the vehicle to exit the vehicle without initiating the alarm. In this case, the capacitor 270 has a time delay of about one minute, although the time can vary depending upon the size of the capacitor 270.

It can be observed that the diode 264 prevents energization of the transistor 258 when the ignition is off, or otherwise the capacitor would quickly discharge through the ignition switch.

The diode 276 in the conductor 272 will also keep the capacitor 270 charged. In this way, the driver of the vehicle can leave the cab portion of the vehicle and enter another access portion, as for example, the trunk, without having to wait for the alarm to go off. Thus, if the hood switch 274 is closed, current will still flow through the capacitor 270 charging the same and reverse biasing the transistor 258 keeping the transistor 258 off so that the sequential timers 234 and 236 cannot be triggered.

When the transistor 256 is conducting, it will effectively take current from the silicon controlled rectifier 254, turning off the rectifier 254 and causing the reset line to go low, which, in turn, causes the timers 234 and 236 to be deenergized. The transistor 256 will be energized when the proper code has been introduced, and, in like manner, the transistor 40 is biased on by introduction of the code so that the transistor 256 is biased on as a result of the on bias of the transistor 40.

When the system is activated by proper actuation of the input switches SW$_1$ through SW$_{12}$ in proper light sequence, the red light 16 on the front plate of the case will show that the vehicle is operational and can be started at any time within a time delay period established by the hold circuit, as for example 30 seconds. After the established time delay, the entire circuit will be deenergized thereby requiring proper introduction of the code again.

When leaving the vehicle for servicing or for parking or under care of another person authorized to operate the vehicle, it is not necessary to disclose the code and the operator merely has to introduce the proper code in proper sequence for generation of the enabling signal and actuate the hold switch SW$_{12}$.

While the latches L$_1$ and L$_4$ have been shown with NAND gates, it should be observed that other forms of gating means could be employed, as for example NOR gates or the like. Moreover, it can be observed that the gates in each of the latches essentially establish a form of RS flip-flop, whereas other forms of flip-flops, including JK flip-flops, or the like, may be used. In essence, any form of logic gating may form part of these latches to operate the circuit of the present invention. In this respect, it should be noted that one of the important aspects is that the logic circuitry may be essentially separated from the input switches, and in this way it is virtually impossible for one to detect the code used in this system.

It can be observed in accordance with the present invention that the programmable safety interlock system comprises a series of electronic latches, each of which is capable of being shifted between a set and a reset state. The latches are connected in such a way that the first latch in a series must be in a proper state before the next latch can be set or reset. When all of the latches have been set (or reset) in accordance with the preselected code and in the proper sequence, the current can then flow to the electrical component of the vehicle, such as the starter solenoid coil, the fuel pump, the electrically operable portion of the transmission, or other similar electrical component, or combination thereof. Once the latches generate an enabling signal to permit operation of the electrical component, the electrical circuitry controlling the current to this circuit will allow continual current flow as long as the engine is running, regardless of whether the lock is turned on or off. However, once the engine is shut off, the electrical component of the engine which is controlled by the safety interlock system cannot be again operated until the code has been introduced in the proper sequence.

One of the advantages of the system of the present invention is that the electronic components are quite small and can be packaged in a relatively small housing. This housing (not shown) can be located in any inaccessible location in the vehicle, as for example, either in the passenger compartment or in the engine compartment. The switches which control the electronics are, however, located in the passenger compartment in close proximity to the driver's position.

After the operator of the system actuates the correct five push button switches in the proper sequence, the light-emitting diode 16 will be energized, which indicates that the vehicle is now in a proper operational condition. Thereafter, the operator may then start the vehicle within the allowed time delay period as established by the hold circuit 20, as for example, 30 seconds. In the event that a thief or someone attempted to unauthorizedly remove the vehicle, it would almost be necessary to jack-up the rear of the car in order to obtain access to the transmission or to jack-up the front of the car in order to obtain access to the starter solenoid. In this case, the alarm would be energized after the 17-second time delay. It would then be necessary to remove the connector at this component and insert a new connector, and thereafter connect wires from this new connector to a voltage source. Thereafter, it would be necessary to bypass all of the normal locks and ignition guards on the vehicle.

While it is virtually impossible to guarantee that any vehicle is foolproof from the point of theft or other unauthorized removal, it has been well established that a thief will not attempt to steal a vehicle unless the vehicle can be quickly removed, as for example, within a matter of several seconds, or at the longest several minutes. Accordingly, the safety interlock system of the present invention obviates almost all possible normal theft and other forms of normal unauthorized removal.

The system of the present invention is uniquely designed so that it can only respond to the proper code. The latches in the system are not responsive to or affected by large voltage changes in the vehicle power source, as for example, the battery. In addition, the electronic components are not affected by electronic noise, as for example, that noise created by horns, electronic ignitions, lights and the like. In the event that a thief or other person who would attempt to unauthorizedly remove the vehicle would cut any of the wires from the switch panel to the safety interlock system, the safety interlock system would immediately remain in the off position. Even if it were attempted to ground certain wires of the vehicle or add additional current, as for example, from a "hot wire", to any or all of the wires of the system, the latches would still remain in the off condition.

The safety interlock system of the present invention will not affect normal maintenance of the vehicle and, more important, is so uniquely designed that it cannot possibly create any damage to the electrical system of the vehicle. Moreover, the system is so uniquely designed so that the customer can recode his own safety interlock system at any time. It is easy and convenient to recode the system by merely connecting any one of the switches SW$_1$ through SW$_{12}$ to any of the latches, as illustrated.

Thus, there has been illustrated and described a unique and novel safety interlock system which effectively prevents the theft or other unauthorized removal of a vehicle or similar electrically operable system. Accordingly, the safety interlock system of the present invention provides all of the advantages and objects sought therefor. It should be understood that many changes, modifications, variations and other uses and applications will become apparent to those skilled in the art after considering this specification and the accompanying drawings. Therefore, any and all such changes, modifications, variations and other uses and application which do not depart from the spirit and scope of the invention are deemed to be covered by the invention.

Having thus described my invention, what I desire to claim and secure by letters patent is:

1. A safety interlock system to prevent theft or unauthorized removal of a vehicle having an engine system for powering said vehicle with an electrical component forming part of the engine system, said interlock system comprising:

(a) a plurality of manually operable switch elements, each representing a separate indicium of a code for energizing said interlock system to enable operation of said vehicle when a plurality of said switch elements have been actuated in proper sequence to conform to the preestablished sequence of indicia of said code, (b) means operatively associated with said switch elements to generate an electrical signal in response to actuation of said switch elements, (c) a plurality of electronic latches, each of said latches being connected in operative relation to certain of said switch elements and in such arrangement that said latches are switched to a proper state to generate an enabling signal in response to said electrical signals only when said switch elements are operated in proper sequence to conform to the preestablished sequence of indicia of said code, (d) a solid state circuit component associated with the electrical component and being connected to the output of said latches, and being operable in response to said enabling signal to thereby permit operation of said electrical component, and (e) a locking circuit operatively connected to the output of said latches and operating in conjunction with an electrically operable lock release mechanism located to permit locking and opening of an access means to a compartment of said vehicle, said locking circuit generating a signal to actuate said lock release mechanism and permit opening of said access means when an enabling signal is generated and to prevent opening of said access means when said enabling signal is not generated.

2. The safety interlock system of claim 1 further characterized in that said lock release mechanism is operatively connected to and operates an access means lock device located in relation to said compartment.

3. The safety interlock system of claim 2 further characterized in that said compartment is an engine compartment and said access means is a cover member which permits closing of said engine compartment.

4. The safety interlock system of claim 1 further characterized in that said solid state circuit component is a silicon-controlled rectifier.

5. The safety interlock system of claim 1 further characterized in that said electrical component is a starter solenoid of said vehicle.

6. The safety interlock system of claim 2 further characterized in that said lock release mechanism is mechanically connected to a mechanically operable lock device normally provided on said vehicle for controlling operation of said lock device.

7. The safety interlock system of claim 2 further characterized in that said lock release mechanism comprises a solenoid which is energized in response to generation of an enabling signal, and is mechanically opened by manual actuation thereof.

8. The safety interlock system of claim 1 further characterized in that a second solid state circuit component is operatively connected to said first solid state circuit component and said locking circuit.

9. The safety interlock system of claim 1 further characterized in that an alarm circuit is operatively connected to the output of said latches and to said locking circuit, and an alarm mechanism operable by said alarm circuit to generate an alarm after a predetermined time interval if said enabling signal is not generated.

10. The safety interlock system of claim 1 further characterized in that each of said plurality of switch elements produce an electrical signal of duration equal to the time that any particular one of said switch elements is actuated, and capacitor means operating connected to the output of said switch elements to compensate for the different durations of any of said electrical signals and transients therein.

11. A safety interlock system to prevent theft or unauthorized removal of a vehicle having an engine system for powering said vehicle with electrical component forming part of the engine system, said interlock system comprising:

(a) a plurality of manually operable switch elements, each representing a separate indicium of a code for energizing said interlock system to enable operation of said vehicle when a plurality of said switch elements have been actuated in proper sequence to conform to the preestablished sequence of indicia of said code, (b) means operatively associated with said switch elements to generate an electrical signal in response to actuation of said switch elements, (c) a plurality of gating elements, each of said gating elements being connected in operative relation to certain of said switch elements and in such arrangement that said gating elements are switched to a proper state to generate an enabling signal in response to said electrical signals only when said switch elements are operated in proper sequence to conform to the preestablished sequence of indicia of said code and thereby permit operation of said electrical component, (d) a solid state circuit component associated with the electrical component and being connected to the output of said latches, and being operable in response to said enabling signal to thereby permit operation of said electrical component, and (e) a system override switch operatively connected to said switch elements and having a first position where the interlock system is operatively connected to a direct current source of electrical power to operate said electrical component, said override switch having a second position where said interlock system is operatively connected to said gating elements to hold said gating elements in a proper state for a predetermined time period so the switch elements may be operated in proper sequence during said predetermined time period.

12. The safety interlock system of claim 11 further characterized in that a solid state circuit component is associated with the electrical component and being connected to the output of said gating elements and being operable in response to said enabling signal to thereby permit operation of said electrical component.

13. The safety interlock system of claim 11 further characterized in that said system override switch is operatively connected to a hold circuit forming part of the safety interlock system, said hold circuit comprising a pair of multistable elements with one of said multistable elements being biased to one state and the other of said multistable elements being biased to an opposite state, a pair of solid state circuit active elements with each being respectively operated by said multistable elements, and capacitive means to provide a preestablished time delay.

14. A safety interlock system to prevent theft or unauthorized removal of a vehicle having an engine system for powering said vehicle with an electrical component forming part of the engine system, said interlock system comprising:

(a) a plurality of manually operable switch elements, each representing a separate indicium of a code for energizing said interlock system to enable operation of said vehicle when a plurality of said switch elements have been actuated in proper sequence to conform to the preestablished sequence of indicia of said code, (b) means operatively associated with said switch elements to generate an electrical signal in response to actuation of said switch elements, (c) a plurality of electronic latches, each of said latches being connected in operative relation to certain of said switch elements and in such arrangement that said latches are switched to a proper state to generate an enabling signal in response to said electrical signals only when said switch elements are operated in proper sequence to conform to the preestablished sequence of indicia of said code, (d) a solid state circuit component associated with the electrical component and being connected to the output of said latches, and being operable in response to said enabling signal to thereby permit operation of said electrical component, and (e) an alarm circuit operatively connected to the output of said latches, said alarm circuit comprising:

(1) means for generating pulses at a periodic preselected rate, (2) a timing means, (3) a first solid state circuit active element operatively connected to the means for generating pulses to be pulsed thereby and also being operatively connected to said timing means, (4) and a second solid state circuit active element operatively connected to said first circuit active element and to the output of said electronic latches and being capable of biasing said first circuit active element to enable generation of an alarm signal after a predetermined time delay established by said timing means if the enabling signal has not been generated and unauthorized tampering of the vehicle results.

15. The safety interlock system of claim 14 further characterized in that said timing means comprises a pair of sequential timers, the first of which biases the second after said predetermined time delay.

16. The safety interlock system of claim 15 further characterized in that a first trigger switch is operatively connected to one of said timers for initiating an alarm after the predetermined time delay if on attempts to unauthorizedly start the engine system without actuating said switch elements in proper sequence to conform to said code.

17. The safety interlock system of claim 16 further characterized in that a second trigger switch is operatively connected to one of said timers for initiating an alarm on a condition of unauthorized entry into said vehicle and a third trigger switch is operatively connected to one of said timers for initiating an alarm on a condition of unauthorized vibration of said vehicle.

18. The safety interlock system of claim 17 further characterized in that said first and third trigger switches are connected to said first sequential timer and said second trigger switch is connected to said second sequential timer.

19. The safety interlock system of claim 14 further characterized in that a locking circuit is operatively connected to the output of said latches and operating in conjunction with an electrically operable lock release mechanism located to permit locking and opening of an access means to a compartment of said vehicle, said locking circuit generating a signal to actuate said lock release mechanism and permit opening of said access means when an enabling signal is generated and to prevent opening of said access means when said enabling signal is not generated.

20. The safety interlock system of claim 14 further characterized in that said lock release mechanism is operatively connected to and operates an access means lock device located in relation to said compartment.

21. The safety interlock system of claim 20 further characterized in that said lock release mechanism is mechanically connected to a mechanically operable lock device normally provided on said vehicle for controlling operation of said lock device.

22. The safety interlock system of claim 14 further characterized in that each of said plurality of switch elements producing an electrical signal of duration equal to the time that any particular one of said switch elements is actuated, and capacitor means operating connected to the output of said switch elements to compensate for the different durations of any of said electrical signals and transients therein.

23. A method of using a safety interlock system to prevent theft or unauthorized removal of a vehicle having an engine system provided with an electrical component forming part of the engine system, said method comprising:

(a) manually actuating a plurality of switch elements with each representing a separate indicium of a code for energizing the interlock system to enable operation of said vehicle when a plurality of said switch elements have been actuated in proper sequence to conform to the pre-established sequence of indicia of said code, (b) generating an electrical signal in response to actuation of said switch elements, (c) switching a plurality of latches to a proper state in response to said electrical signals only when said switch elements are operated in proper sequence to conform to the pre-established sequence of indicia of said code, and with each of said latches being connected in operative relation to certain of said switch elements and in such arrangement that said latches are switched to the proper state when the switches are actuated in proper sequence, (d) generating an enabling signal when each of said switches is actuated in the proper sequence, (e) permitting operating of said electrical component in response to said enabling signal from the output of said latches, and (f) generating a lock release signal when each of said switch elements are actuated in proper sequence and said enabling signal has been generated to permit opening of an electrically operable lock release mechanism, said lock release mechanism permitting opening of an access means to said vehicle, when said lock release signal has been generated.

24. The method of claim 23 further characterized in that the method comprises opening and closing an access means lock device located in relation to an access opening to a portion of the vehicle when said lock release signal has been generated.

25. The method of claim 24 further characterized in that the method comprises electronically energizing said lock release mechanism in response to said lock release signal and mechanically opening said lock release mechanism and said lock device by manual actuation.

26. The method of claim 25 further characterized in that said method comprises generating an alarm signal and actuating an alarm after a predetermined time interval if said enabling signal has not been generated and one attempts to start said vehicle.

27. The method of claim 23 further characterized in that said method comprises generating said electrical signals of duration equal to time that any particular one of said switch elements is actuated to compensate for the different durations of any of said electrical signals and transients therein by capacitor means operatively connected to the output of said switch elements.

28. A method of using a safety interlock system to prevent theft or unauthorized removal of a vehicle having an engine system provided with an electrical component forming part of the engine system, said method comprising:
(a) manually actuating a plurality of switch elements with each representing a separate indicium of a code for energizing the interlock system to enable operation of said vehicle when a plurality of said switch elements have been actuated in proper sequence to conform to the pre-established sequence of indicia of said code,
(b) generating an electrical signal in response to actuation of said switch elements,
(c) switching a plurality of latches to a proper state in response to said electrical signals only when said switch elements are operated in proper sequence to conform to the pre-established sequence of indicia of said code, and with each of said latches being connected in operative relation to certain of said switch elements and in such arrangement that said latches are switched to the proper state when the switches are actuated in proper sequence,
(d) generating an enabling signal when each of said switches is actuated in the proper sequence,
(e) permitting operation of said electrical component in response to said enabling signal from the output of said latches,
(f) generating pulses at a periodic preselected rate,
(g) generating an alarm initiating signal after a predetermined time delay established by a timing means,
(h) actuating a solid state circuit active element by said alarm initiating signal to generate an alarm signal after said predetermined time delay if the enabling signal has not been generated and unauthorized tampering of the vehicle results.

29. The method of claim 28 further characterized in that the timing means comprises a pair of sequential timers and that the method comprises biasing one of the timers upon unauthorized tampering and tereafter biasing the second of the timers by the first timer after the time delay period.

30. The method of claim 28 further characterized in that said method comrpises switch elements actuated in the proper sequence and said enabling signal has been generated to permit opening of an electrically operable lock release mechanism, said lock release mechanism permitting opening of an access means to said vehicle, when said lock release signal has been generated.

31. The method of claim 30 further characterized in that the method comprises opening and closing an access means lock device located in relation to an access opening to a portion of the vehicle when said lock release signal has been generated.

32. The method of claim 31 further characterized in that the method comprises electronically energizing said lock release mechanism in response to said lock release signal and mechanically opening said lock release mechanism and said lock device by manual actuation.

33. A method of using a safety interlock system to prevent theft or unauthorized removal of a vehicle having an engine system with an electrical component forming part of the engine system, said interlock system comprising:
(a) manually actuating a plurality of switch elements with each representing a separate indicium of a code for energizing the interlock system to enable operation of said vehicle when a plurality of said switch elements have been actuated in proper sequence to conform to the pre-established sequence of indicia of said code,
(b) generating an electrical signal in response to actuation of said switch elements,
(c) switching a plurality of gating elements to a proper state in response to said electrical signals only when said switch elements are operated in proper sequence to conform to the pre-established sequence of indicia of said code and with each of said gating elements being connected in operative relation to certain of said switch elements and in such arrangement that said gating elements are switched to the proper state when the switches are actuated in proper sequence, to thereby permit operation of said electrical component,
(d) actuating a system override switch operating connected to said switch elements and having a first position, said interlock system being operatively connected to a direct current source of electrical power to operate said electrical component upon shifting said override switch to said first position, said override switch having a second position where said interlock system is operatively connected to said gating elements to hold said gating elements in a proper state for a predetermined time period so that the switch elements may be operated in proper sequence during said predetermined time delay period upon shifting said override switch to said second position,
(e) generating a lock release signal when each of said switch elements are actuated in the proper sequence and said enabling signal has been generated to permit opening of an electrically operable lock release mechanism, said lock release mechanism permitting opening of an access means to said vehicle when said lock release signal has been generated, and
(f) generating an alarm signal and actuating an alarm after a predetermined time interval if said enabling signal has not been generated and one attempts to start said vehicle.

34. The method of claim 33 further characterized in that the method comprises opening and closing an access means lock device located in relation to an access opening to a portion of the vehicle when said lock release signal has been generated.

35. The method of claim 34 further characterized in that the method comprises electronically energizing said lock release mechanism in response to said lock release signal and mechanically opening said lock release mechanism and said lock device by manual actuation.

36. An alarm circuit usable in conjunction with a safety interlock system to prevent theft or unauthorized removal of a vehicle, said alarm circuit comprising:
   (1) means for generating pulses at a periodic preselected rate,
   (2) a timing means,
   (3) a first solid state circuit active element operatively connected to the means for generating pulses to be pulsed thereby and also being operatively connected to said timing means,
   (4) and a second solid state circuit active element operatively connected to said first circuit active element and being capable of biasing said first circuit active element to enable generation of an alarm signal after a predetermined time delay established by said timing means if unauthorized tampering of the vehicle results.

37. The alarm circuit of claim 36 further characterized in that said timing means comprises a pair of sequential timers, the first of which biases the second after said predetermined time delay.

38. The alarm circuit of claim 36 further characterized in that said circuit operates in conjunction with a safety interlock system having a plurality of manually operable switch elements, each representing a separate indicium of a code for energizing said interlock system to enable operation of said vehicle when a plurality of said switch elements have been actuated in proper sequence to conform to the preestablished sequence of indicia of said code, means operatively associated with said switch elements to generate an enabling signal in response to said switch elements being operated in proper sequence to conform to the preestablished sequence of indicia of said code, and said second circuit active element is operatively connected to the output of the means to generate an enabling signal such that said alarm signal will only be generated after said predetermined time delay and if said enabling signal has not been generated.

39. The safety interlock system of claim 36 further characterized in that a first trigger switch is operatively connected to one of said timers for initiating an alarm after the predetermined time delay if on attempts to unauthorizedly start the engine system of said vehicle.

40. The safety interlock system of claim 39 further characterized in that a second trigger switch is operatively connected to one of said timers for initiating an alarm on a condition of unauthorized entry into said vehicle and a third trigger switch is operatively connected to one of said timers for initiating an alarm on a condition of unauthorized vibration of said vehicle.

41. The safety interlock system of claim 40 further characterized in that said first and third trigger switches are connected to said first sequential timer and said second trigger switch is connected to said second sequential timer.

* * * * *